United States Patent [19]

Kazato

[11] Patent Number: 5,268,898
[45] Date of Patent: Dec. 7, 1993

[54] INFORMATION TRANSMISSION SYSTEM BETWEEN MACHINE MASTER AND SERVO MECHANISM

[75] Inventor: Hirohiko Kazato, Aichi, Japan

[73] Assignee: Mitsubishi Denki K.K., Tokyo, Japan

[21] Appl. No.: 854,081

[22] Filed: Mar. 19, 1992

[30] Foreign Application Priority Data

Mar. 19, 1991 [JP] Japan .................................. 3-054739

[51] Int. Cl.$^5$ ............................................ H04L 12/42
[52] U.S. Cl. ................................ 370/85.6; 370/85.15; 340/825.06; 340/825.5; 318/562
[58] Field of Search ................... 318/562, 564, 825.06, 318/825.07, 825.08, 825.54, 825.5, 825.51, 870.11, 870.12, 870.13; 370/94.1, 85.1, 85.6, 85.7, 85.9, 85.11, 85.12, 85.15

[56] References Cited

U.S. PATENT DOCUMENTS

| | | | |
|---|---|---|---|
| 4,078,196 | 3/1978 | Thadani | 318/562 |
| 4,748,560 | 5/1988 | Kataoka | 370/85.9 |
| 4,928,097 | 5/1990 | Staab et al. | 340/825.5 |
| 5,013,989 | 5/1991 | Kurakake et al. | 318/564 |

Primary Examiner—Wellington Chin
Attorney, Agent, or Firm—Sughrue, Mion, Zinn, Macpeak & Seas

[57] ABSTRACT

An information transmission system for a numerical control (NC) system having a servo mechanism with plural units, wherein the NC issues commands for processing by corresponding servo units and the servo units issue status information for monitoring and display by the NC. A plurality of serial data transmission paths are provided between the NC unit and servo amplifiers and the transmission paths are different in communication cycle in order to allow rapid-response control for large volumes of information transmitted. In particular, the invention also can be applied to a transmission loop in a programmable controller (PC).

13 Claims, 12 Drawing Sheets

INFORMATION TRANSMISSION SYSTEM BETWEEN MACHINE MASTER AND SERVO MECHANISM

BACKGROUND OF THE INVENTION

1. Field of the Invention

The present invention relates to an information transmission system between a master numerical control (hereinafter "NC") unit and a slave servo mechanism having a plurality of servo amplifiers.

2. Description of the Background

Figure 11:
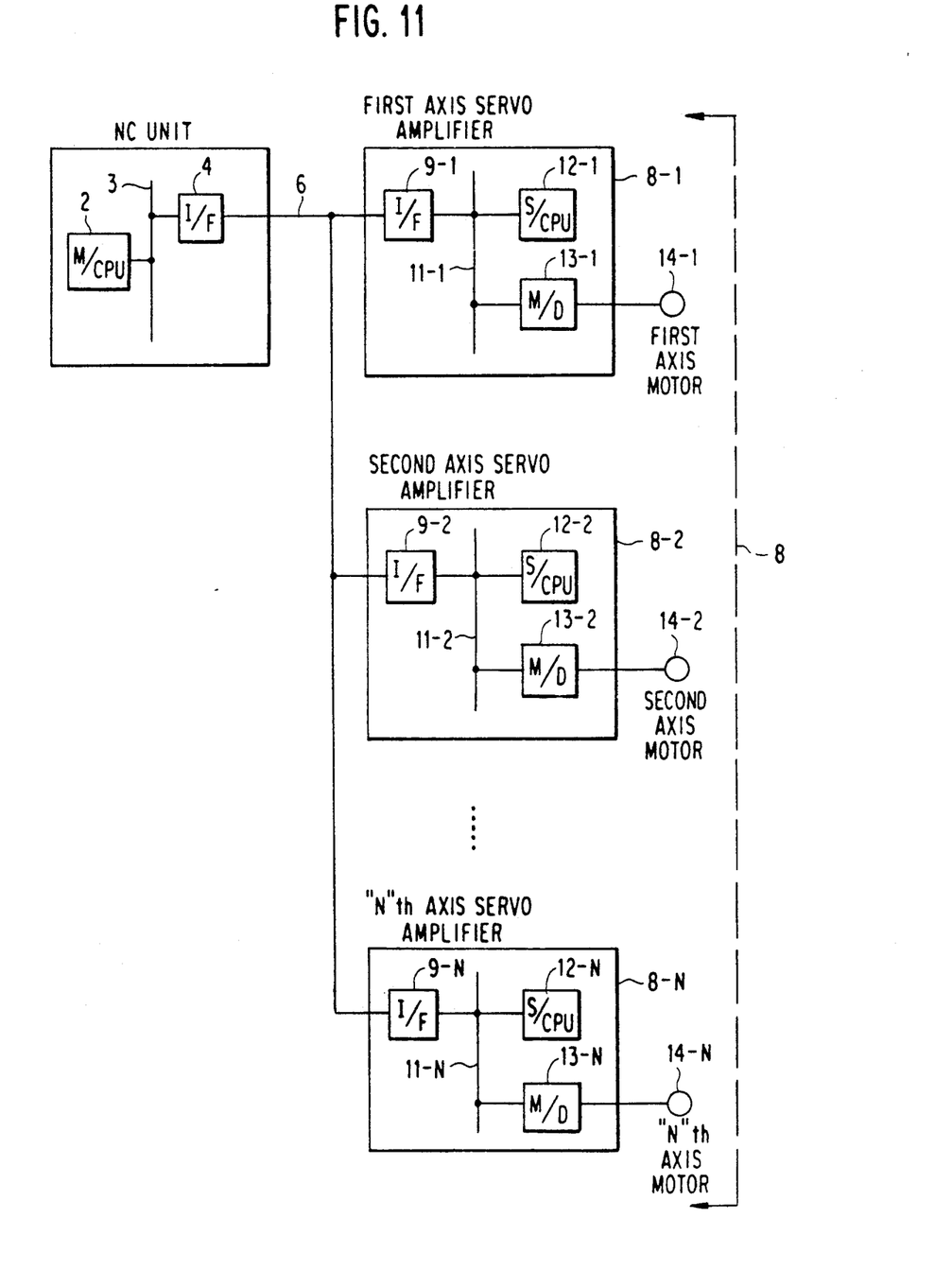
FIG. 11 is a configuration diagram illustrating an information transmission system for a servo mechanism known in the art.

FIG. 11 is a block diagram illustrating a conventional information transmission system connecting an NC master unit to a servo unit, particularly one with plural servo-controlled mechanisms. In the Figure, an NC unit 1 is provided with a main CPU 2 connected with a serial interface 4 via a local data bus 3. A serial information transmission path 6 is provided between the NC unit 1 and a servo unit 8 comprising plural servo amplifiers 8-1 to 8-N, each of which has a conventional servo controller function; in this case all are motors. Each of the servo amplifiers 8-1 to 8-N contains a corresponding servo CPU 12-1 to 12-N to execute the controller function for an individual axis of a controlled object, in response to commands from the NC unit. In this regard, each servo CPU is connected to the main CPU 2 via the serial transmission line 6 and a respective serial interface 9-1 to 9-N. Each servo controller function is executed by the exchange of commands and data between the servo CPU 12-1 to 12-N and a corresponding motor driver 13-1 to 13-N, which operates a drive motor 14-1 to 14-N, via local data bus 11-1 to 11-N.

The operation of the conventional information transmission system to the servo mechanism will now be described with reference to FIGS. 7A-7C, which illustrate various data and their locations in a conventional information transmission. Preliminarily, it should be noted that the volume of information transmitted between the NC unit 1 and the servo unit 8 is high for several reasons. First, the objects to be controlled by the servo unit 8 must perform very complex operational functions. Hence, the number of control axes and, accordingly the number of servo mechanisms, is large and the information transmission volumes are, accordingly, high. Secondly, the control of the servo unit 8 is primarily a digital control because of the progress of microcomputers, etc. Since digital control can respond comparatively easily to a variety of high-level controls, a variety of monitoring functions, self-diagnostic functions, the automatic tuning of servo parameters (control constants), adaptive control, etc. are now incorporated into the servo units.

Figure 7A:
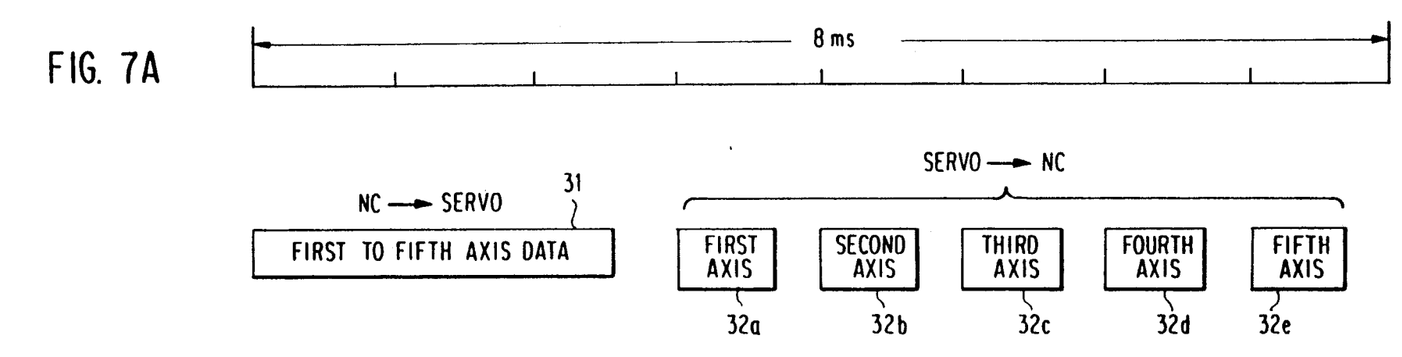
FIGS. 7A–7C shows data locations in the information transmission known in the art.
Figures 7B, 7C:
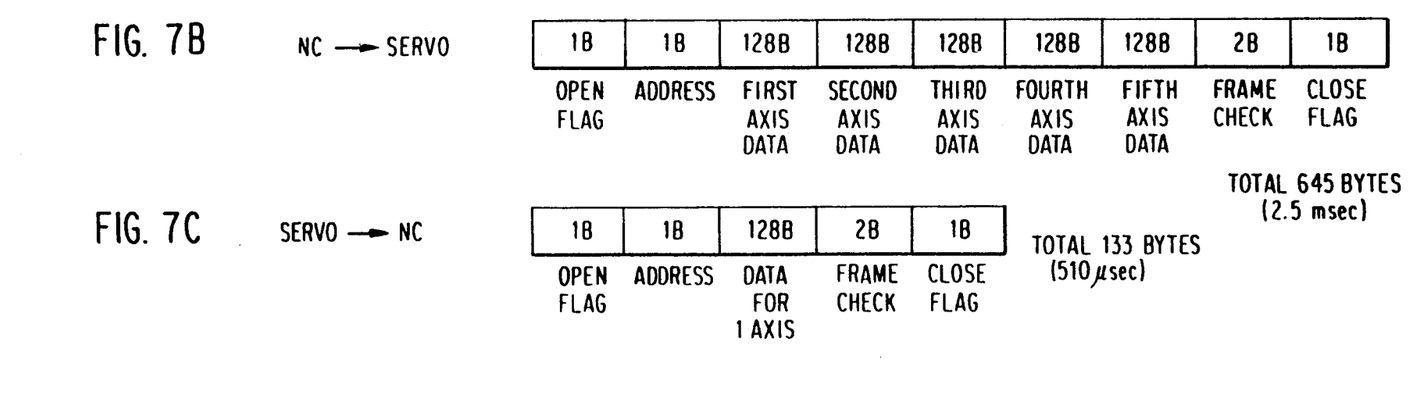

FIGS. 7A-7C provide an example of the conventional servo unit having five control axes to satisfy the above requirements. This example employs half-duplex transmission using the conventional HDLC (high-level data link control) or SDLC (synchronous data link control) standards, which are designed to allow the data of each axis to be assigned to an address specified for each axis by a protocol. FIG. 7A illustrates an 8 ms period divided into one millisecond units that are a reference for the signals transmitted between the NC and servo locations and between the servo locations and the NC.

Referring to FIG. 7A, the numeral 31 indicates a block of data for controlling all servo axes, i.e. data of the first to fifth axes in the described conventional embodiment, which comprises information transmitted from the NC unit 1 to the servo amplifiers 8-1 to 8-N (hereinafter referred to as the "sending end" of the transmitted data). Blocks 32a to 32e indicate individual axis data, i.e. data of the first to fifth control axes, respectively, which are the information transmitted from the servo amplifiers 8-1 to 8-N to the NC unit (hereinafter referred to as the "receiving end" of the transmitted data).

In the illustrated embodiment, the information volume for each axis on the sending end is 128 bytes, so that block 31 comprises a total of 645 bytes (with 5 bytes of overhead) for 5 axes, as seen in FIG. 7B. Assuming that the servo amplifiers carry out a variety of control functions, e.g., position control onward, the sending end information includes position commands, sequence commands, current limits, parameters, etc. The information volume for each axis block 32a-32e on the receiving end also is 128 bytes and has 5 bytes of overhead, as seen in FIG. 7C. It also should be noted that a separation band of 0.5 ms exists between blocks. The receiving end information includes position feedback, speed feedback, current feedback, monitored data, zeroing data, operating status, etc. According to FIGS. 7A, therefore, the total information transmission volume of the sending end 31 is 645 bytes and that of each axis 32a-32e on the receiving end is 133 bytes.

If it is assumed that the baud rate of the information transmission path 6 is 2.5 M according to the current conventional technologies, the total information transmission volume of the sending end of 645 bytes requires 2.5 ms to be processed, as illustrated in FIG. 7C. The total information transmission volume of each receiving end axis of 133 bytes requires 510 μs to be processed, as illustrated in FIG. 7C. Accordingly, the total sum of the processing times of the five receiving end axes is 2.55 ms. Further, the sum of the information transmission processing times of the sending and receiving ends is 5.05 ms. when an additional allowance of 0.5 ms is provided between blocks in the combination of the send and receive ends, a communication cycle of 8 ms in one line of the information transmission path 6 may be selected, as indicated by the scale in FIG. 7A.

For this reason, position command information to the servo amplifiers 8-1 to 8-N is only updated every 8 msec. Hence, when, for example, an immediate stopping function (hereinafter referred to as the "skip stop function") is given from the NC unit 1 to the servo amplifiers 8-1 to 8-N, a maximum delay of 8 ms occurs until a stop can be effected. This delay increases coasting, leading to variations in the actual stop position. Moreover, the total time between the sending of a command from the NC unit to the receipt by the NC unit of a response from the commanded servo amplifier is over 16 ms.

Figure 8:
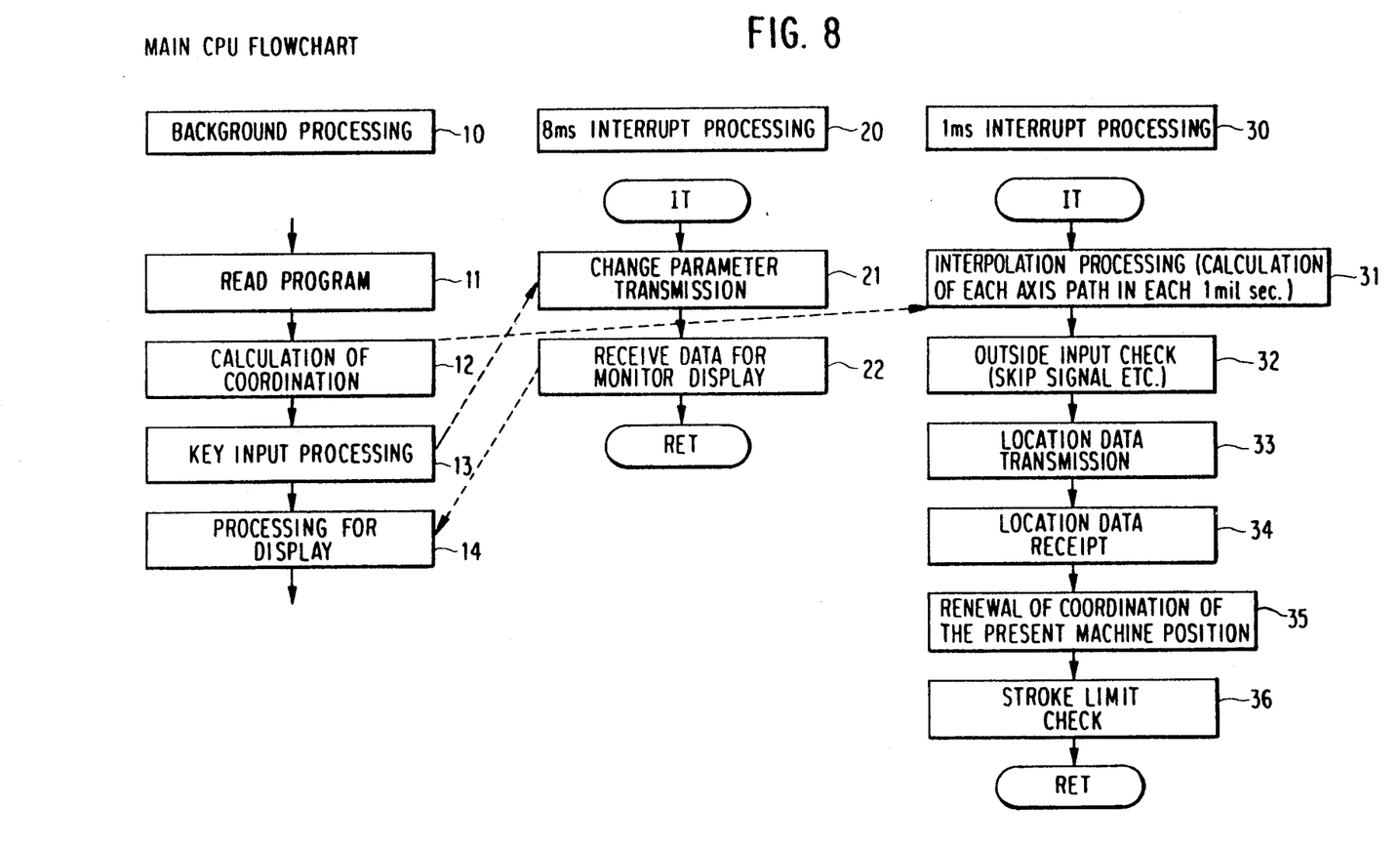
FIG. 8 illustrates a combination of several processings conventionally conducted in the main CPU.
Figure 9:
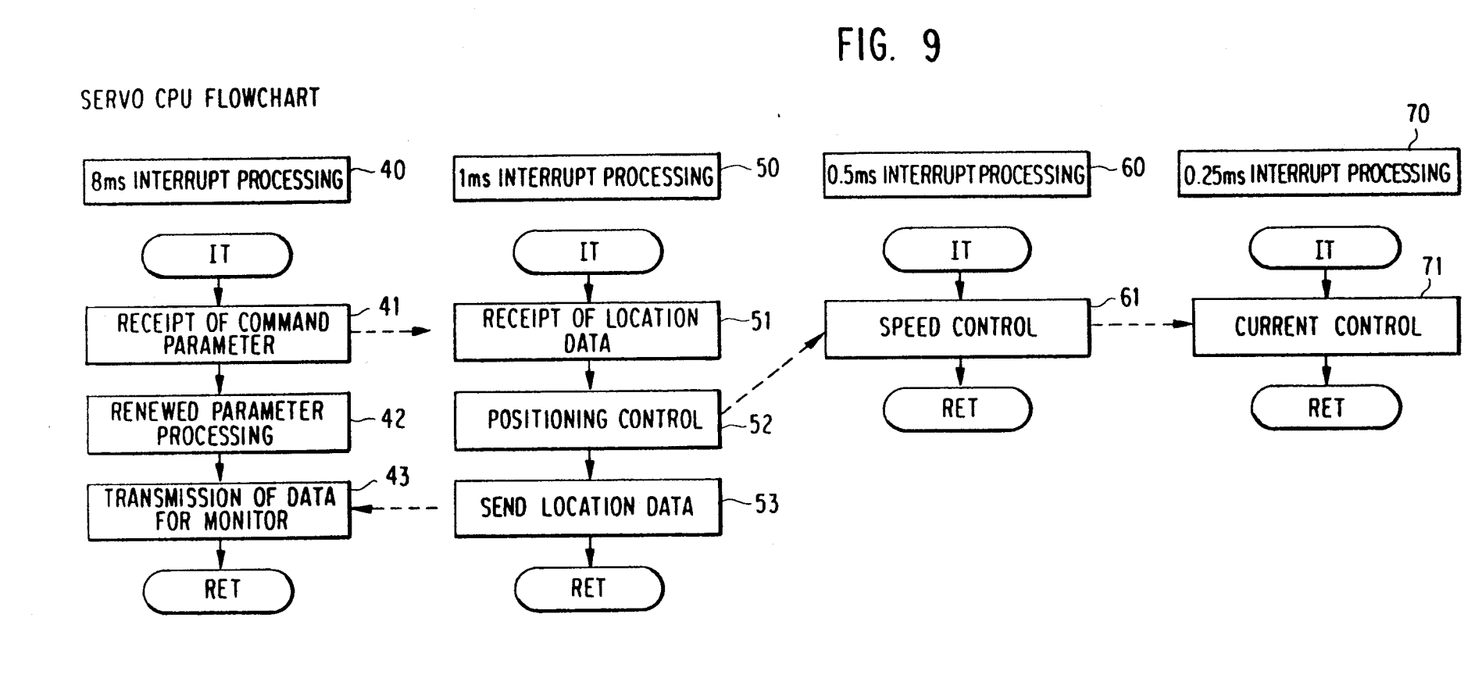
FIG. 9 illustrates a combination of several processings conventionally conducted in the servo CPU.
Figure 10:
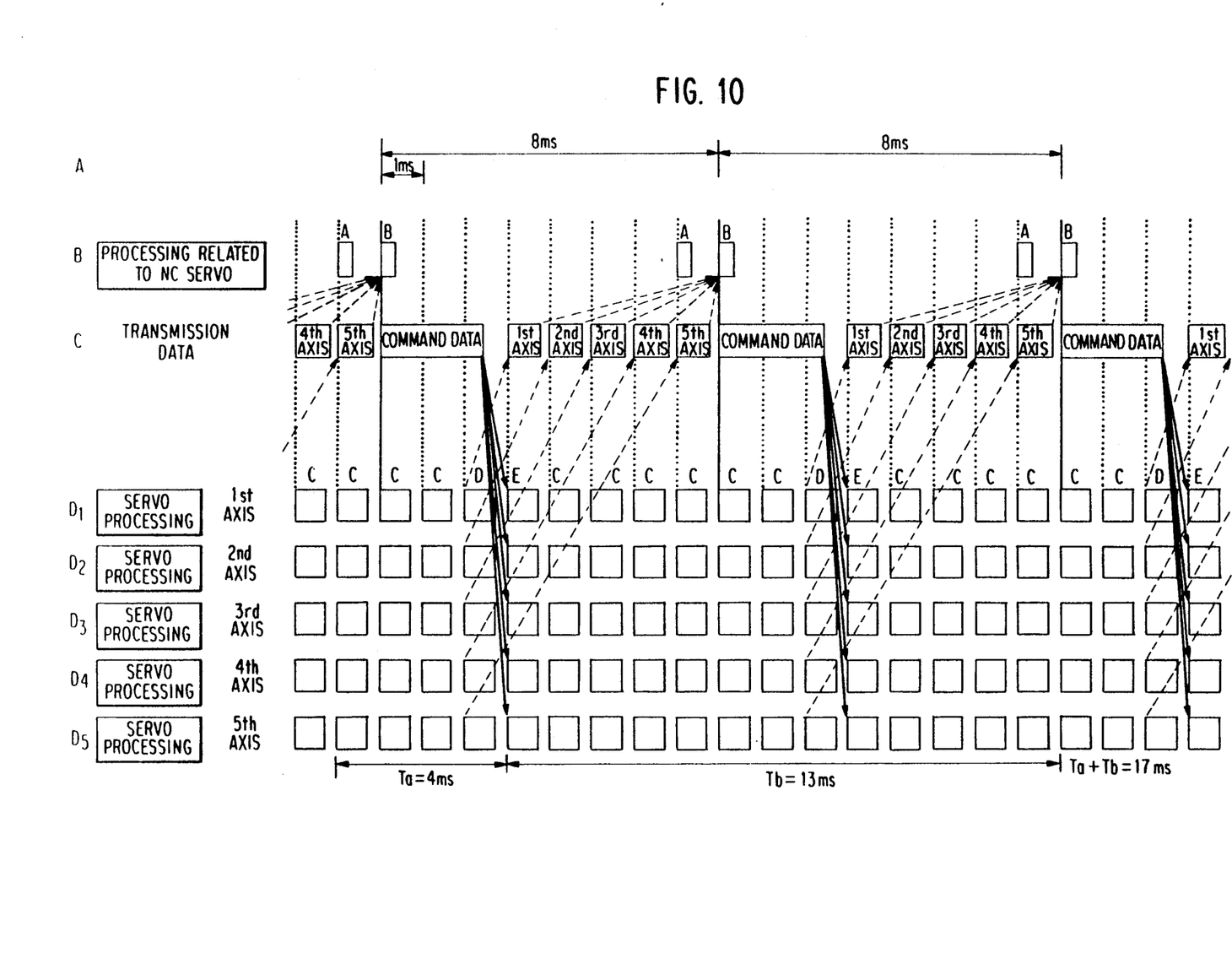
FIG. 10 is a time chart of the several processings conducted in the conventional servo control system.

Specifically, as shown in the main CPU processing flowcharts of FIG. 8 and the servo CPU processing flowcharts of FIG. 9, as well as the timing chart of FIG. 10, a substantial amount of time is consumed in the performance of an axis operation under program control. Turning first to the main CPU flowcharts in FIG. 8, a background processing 10, in which the program is read (step 11), the coordinates calculated (step 12), the necessary keyboard inputs added (step 13) and the display processing conducted (step 14), is performed before transmission of information to the servo CPU. The period for the background processing varies, depending on the functions that must be performed.

If a key input occurs at step 13, during an 8 ms interrupt processing sequence 20, all of the parameters changed as a result of the key input at step 13 are transmitted to the servo amplifiers at step 21. (This is indicated by the connecting dotted lines in the Figure.) Thereafter, the data is received for display on a monitor at step 22.

If a calculation of coordinates for positioning is required at step 12, an interrupt processing sequence 30 begins at step 31. This sequence, consuming about 1 ms for each affected axis, comprises an interpolation processing for calculating the path of each axis at step 31, a check for outside inputs (e.g., a skip-step command) in step 32, a transmission of current position data to the corresponding servo amplifier at step 33, the receipt of position data from a corresponding servo amplifier at step 34, a renewal of the coordinates of the present machine position in step 35 and a stroke limit check in step 36.

At the servo CPU, as shown in FIG. 9, several interrupt processings take place. The first interrupt processing 40 occurs in a sequence that requires about 8 ms. In step 41, the command parameters from the main CPU are received. Then, the processing of the command parameters is conducted in step 42 and monitored data (i.e., speed, current position etc.) is transmitted to a display in step 43. The shading of blocks 41 and 43 identifies the existence of a link between these steps of the sequence in FIG. 9 and shaded steps of the sequence in FIG. 8, e.g., at the servo unit the command parameters are received and monitor data is transmitted. The second interrupt processing 50 is conducted within a duration of about 1 ms per axis and includes a receipt of command (e.g., location) data at step 51. Thereafter, positioning control is effected at step 52 and the position data is sent back to the main CPU in step 53. Again, the shaded areas identify steps involving communication between the master and servo units.

While not directly relevant to the deficiencies of the conventional systems that are solved by the invention, it is useful to note that a third interrupt processing sequence 60 is executed in response to the position control step 52 and conducts speed control processing at step 61. The speed control will effect yet another interrupt processing sequence 70 which, at step 71 requiring 0.25 ms duration, will control the current applied to the motor at each axis.

A comprehensive illustration of the timing sequence of the conventional transmission operation for the system and functions of FIGS. 7A-C, 8, 9 and 11 is presented in FIG. 10, where a sequence of 1 ms periods is allocated to processing and transmission operations during two consecutive 8 ms periods, as seen in line A.

The processing relating to NC servo data in the main CPU, following the background processing 10, is identified in line B as a sequence of processings A and B. At processing A, position command information is formed in the NC unit and transmission processing for position commands and parameters etc. is performed according to the processing 30 of FIG. 8. As illustrated in lines A-C, this operation takes less than 1 ms and its result is provided as command data for transmission (step 33), as indicated by the single solid line arrow from processing A to the sending end block in line C. The subsequent processing B by the NC unit involves the receiving of present position information from the several servo units for monitoring and display purposes (step 34), as indicated by the several dotted line arrows from the receiving end data in line C to the processing B.

The sequence of the sending end and receiving end processings is illustrated for a plurality of communication cycles of 8 ms each, with two complete cycles being shown for purposes of further explanation.

In FIG. 10 lines D1-D5, data blocks for each of the five servo controlled axes is also illustrated in separate rows of servo processing blocks of less than 1 ms each. For each axis, the servo processing of steps 42 and 52 generate position control information that appear in a plurality of successive blocks C. In a block D, position control information as well as present position and monitor data for each axis is subjected to transmission processing at steps 43 and 53, in a specified sequence, as indicated by dotted lines arrows to line C. Finally, during a block E, position control information as well as position command information and parameters for each axis (from the transmission data of line C, as indicated by solid line arrows), is subject to receive processing of steps 41 and 51.

In sum, the generation and transmission of sending end command data to the several servo amplifiers for the first through fifth axis is indicated by the several solid line arrows from the command data block to the receiving processing blocks E of each servo axis. Similarly, the generation and transmission of receiving end data to the main CPU is indicated by the dotted line arrows from block D of each servo axis processing to the receiving end of the transmitted data. These processings are repeated each 8 ms period.

In the illustrated example, the total time Ta for the generation and transmission of command data as a sending block, beginning with the start of processing A to end of transmission processing D, is 4 ms. From the beginning of the receiving end at processing E, through position control processing at processings C, to the completion of the return of monitored data (e.g. current position data just prior to the command) from the servo amplifiers at D, to the receipt and processing of the transmitted data at B, 13 ms is required. Thus, the total communication time between command generation and receipt of information describing the response to the command is 17 ms. This length of time represents undesirable delays and system inefficiency.

The conventional circuit for serial data transmission circuit to servo mechanism poses the aforementioned problem in performance because of a trade-off relationship between the information transmission volume and the communication cycle.

It is, accordingly, an object of the present invention to overcome the disadvantages in the conventional art by providing an information transmission system for a servo mechanism which can accommodate a large volume of transmitted information without failure.

It is another object of the present invention to permit urgent information to be communicated more rapidly than information which may be delayed.

It is yet another object of the present invention to permit the concurrent transmission of information on different cycles.

SUMMARY OF THE INVENTION

The information transmission system of the present invention has a master control unit and a plurality of slave units connected for serial communication by a multiple transmission path structure, comprising a plurality of transmission paths. Further, the communication cycles of the transmission paths comprising the multiple transmission path structures are different from each other.

In particular, the present invention has multiple lines serving as serial data transmission paths to transmit limited quantities of data in a short cycle and large volumes of data in a long cycle. Urgent data or commands are assembled and transmitted on the short cycle while monitored or display data is assembled and transmitted on the long cycle.

Specifically, the invention achieves an information transmission system applicable to a servo mechanism, wherein a plurality of serial data transmission paths are provided between an NC unit and servo amplifiers and the transmission paths are different in communication cycle in order to allow rapid-response control for large volumes of information. Urgent information, such as position commands and parameters, are assembled and transmitted on a short cycle for immediate response, while position information for monitoring and display is assembled and transmitted on a long cycle. The invention is not limited to NC systems and can be applied to a transmission loop in a programmable controller (PC).

DESCRIPTION OF THE PREFERRED EMBODIMENTS

Figure 1:
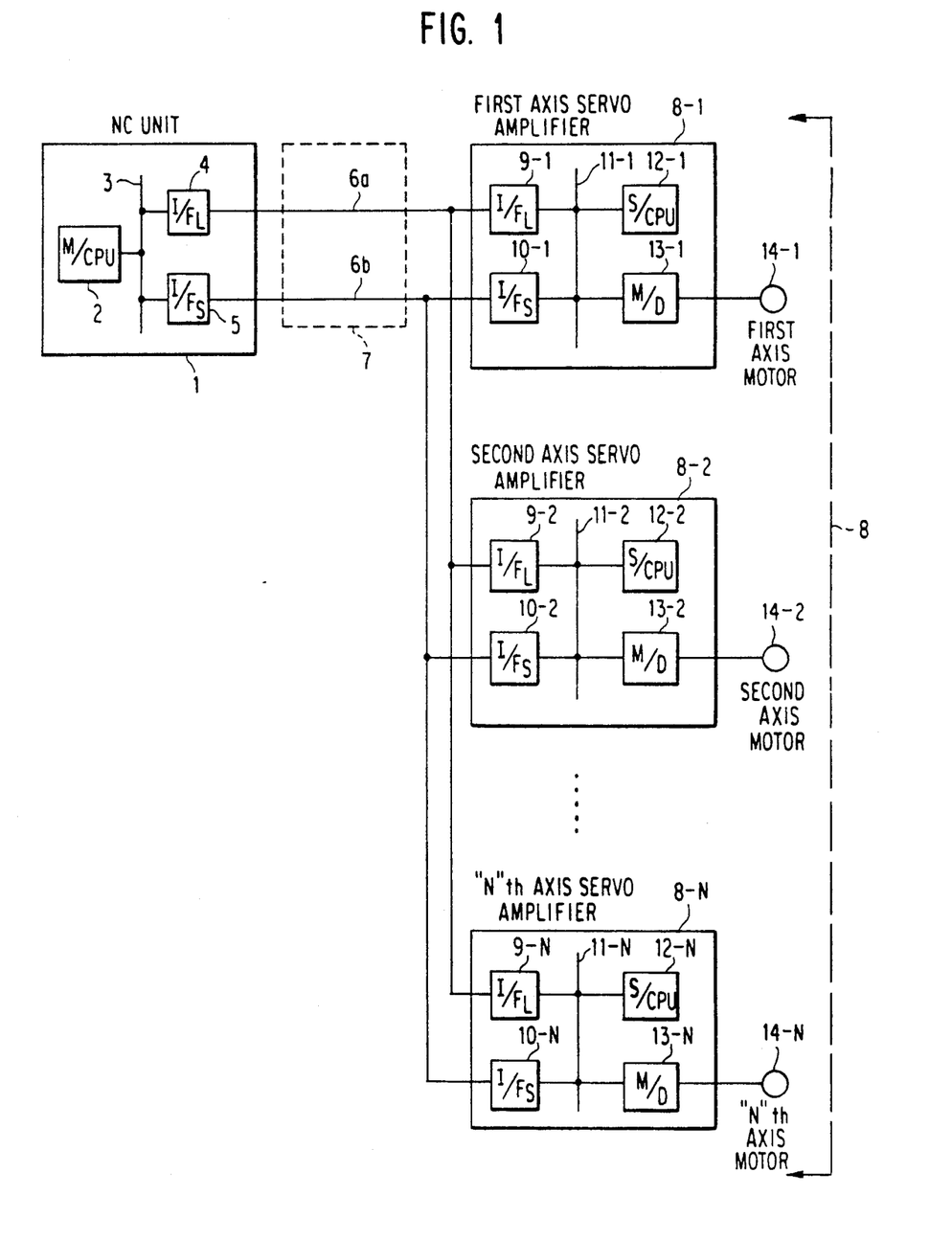
FIG. 1 is a configuration diagram illustrating an embodiment of an information transmission system between a servo mechanism and a NC unit, according to the present invention.
Figure 2A:
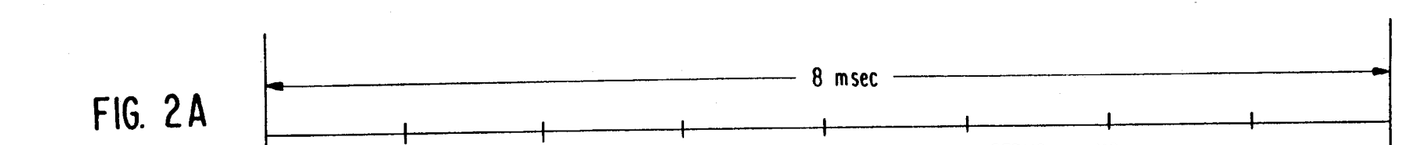
FIG. 2A–D illustrate data locations in the information transmission according to a first feature of the present invention.
Figure 2B:
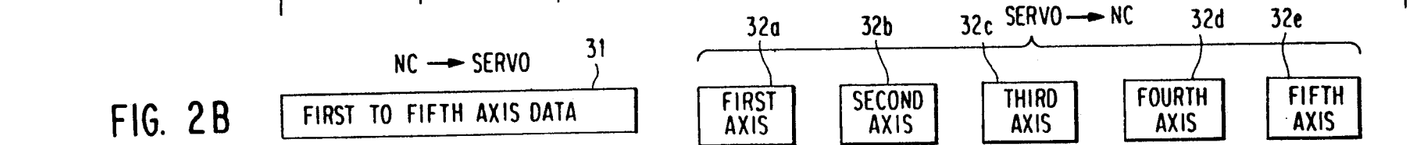
Figure 2C:
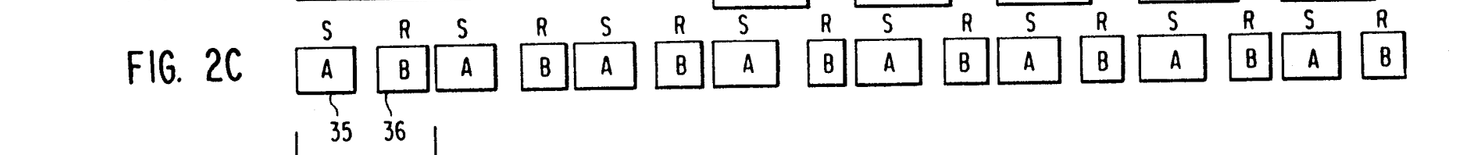
Figure 2D:
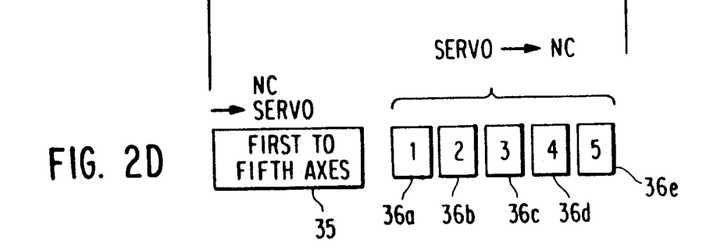

FIG. 1 is a configuration diagram of an information transmission system between a NC unit and a servo mechanism according to the present invention, showing two lines as an example of multiple transmission paths. In FIG. 1, the numerals identical to those in the conventional design identify identical or corresponding parts. The NC unit 1 is provided with a main CPU 2 that connects with a long-cycle serial interface (I/F$_L$) 4 and a short-cycle serial interface (I/F$_S$) 5 via a local data bus 3. The numeral 6a indicates a long-cycle serial data transmission path, for information transmission between the NC unit 1 and servo mechanism, which has a long communication cycle for information transmission (hereinafter referred to as the "long-cycle end"). Also provided is a short-cycle serial data transmission path 6b, providing transmissions similar to the long-cycle serial data transmission path 6a, which has a short communication cycle for information transmission (hereinafter referred to as the "short-cycle end"). A multiple transmission path unit 7, comprising the long-cycle serial data transmission path 6a and short-cycle serial data transmission path 6b, interfaces to plural servo amplifiers. In the servo amplifiers 8-1 to 8-N, corresponding servo CPUs 12-1 to 12-N are connected to paths 6a and 6b via the long-cycle serial interfaces (I/F$_L$) 9-1 to 9-N, short-cycle serial interfaces (I/F$_S$) 10-1 to 10-N and local data buses 11-1 to 11-N, and are further connected via the buses with the motor drivers 13-1 to 13-N to drive the motors 14-1 to 14-N.

Operation will now be described in reference to FIGS. 2 and 3A–C, wherein the numerals identical to those in the conventional device designate identical or corresponding parts. In considering FIGS. 2 and 3A–C, it is assumed that the object to be controlled has five axes and the half-duplex transmission path using HDLC has two lines. FIG. 2 is an overall drawing illustrating for an 8 ms period, as defined in line A, the data locations of sending end and receiving end data for both the long-cycle and short-cycle ends. The Figure illustrates the long-cycle end data in line B, the short-cycle end data in line C and short-cycle end data expanded view in line D. The numeral 31 indicates all-axis data (NC to servos) and individual axis data (servos to NC) 32a to 32e indicate long-cycle end data. The numeral 35 indicates short-cycle all-axis data (NC to servos) of the short-cycle end, and 36 indicates short-cycle individual axis data similar to the all-axis data 35 (but from servo to NC, individually represented as 36a–36e). The letter "S" stands for the sending end and "R" the receiving end. "A" means the data of the first to fifth axes combined and "B" means the data of individual first to fifth axes.

Figure 3A:
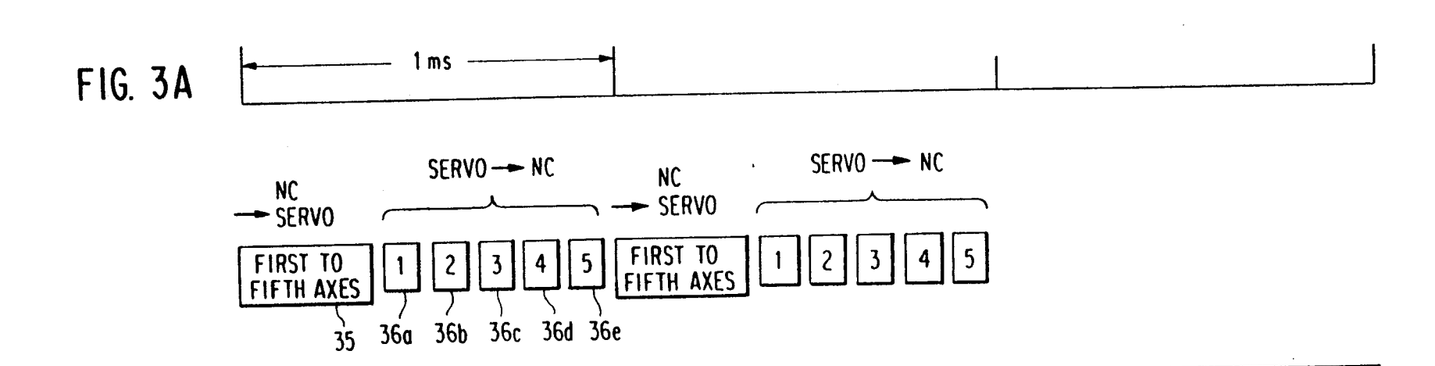
FIGS. 3A–C illustrate data locations in the information transmission according to a second feature of the present invention.
Figures 3B, 3C:
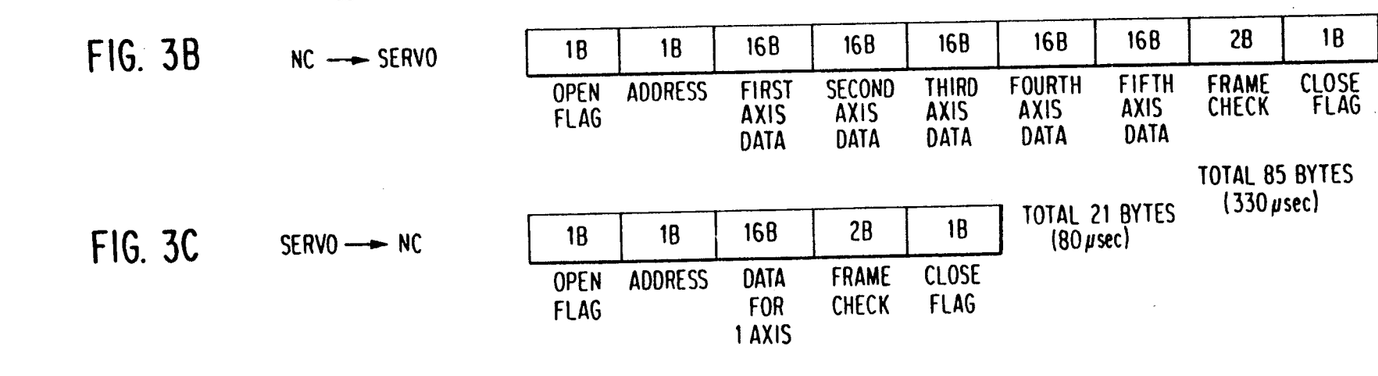

FIGS. 3A–C illustrate the locations of the short-cycle data. FIG. 3A illustrates three 1 ms periods and the NC to servo information 35 that occurs in a first part of each period and the servo to NC information 36a–36e that appears in the second part of the period. FIG. 3B shows the content of the NC to servo information, comprising flag, address, data and check information. FIG. 3C shows the servo to NC data for one axis, including flag, address, data and check information.

The information volume of each sending end axis on the short-cycle end is 16 bytes. If it is assumed that the servo amplifier can perform the necessary control functions locally, including positioning etc., the information for each axis simply comprises position commands, sequence commands, current limits, and the like. The information volume of each axis on the receiving end is also 16 bytes. This information comprises position feed rate, operating status, etc. According to FIGS. 3B and 3C, therefore, the total of the sending end information transmission volume on the short-cycle end is 85 bytes (including 5 bytes spacing) and the total of the information transmission volume for each axis on the receiving end is 21 bytes.

The long-cycle data locations are identical to those in FIGS. 7A–C. Accordingly, the information volume of each sending end axis on the long-cycle end is 128 bytes. This information volume is that of parameter changes, etc. The information volume of each axis on the receiving end is also 128 bytes. This information volume is that of the monitored data of speed feedback, current feedback, serving data, etc. According to FIG. 7A–C, therefore, the total of the sending end information transmission volume on the long-cycle end is 645 bytes and the total of the information transmission volume on the receiving end is 133 bytes.

Assuming that the baudrate is 2.5 M, the communication cycle of the long cycle end is 8 msec according to the known calculation, as taught in the conventional art.

However, on the short cycle end, since the total of the information transmission volume of the sending end is only 85 bytes, a mere 330 $\mu$s is required to process that information. Since the total information transmission volume of each axis on the receiving end is 21 bytes, 80 $\mu$s is required to process that information, and since the number of axes controlled is five, the total sum of the receiving end processing time for all 5 axes is 400 $\mu$s. Further, the sum of the information transmission processing times on the sending end and receiving end is 730 $\mu$s, and the communication cycle is less than 1 ms, even with a little allowance provided.

Figure 6A:
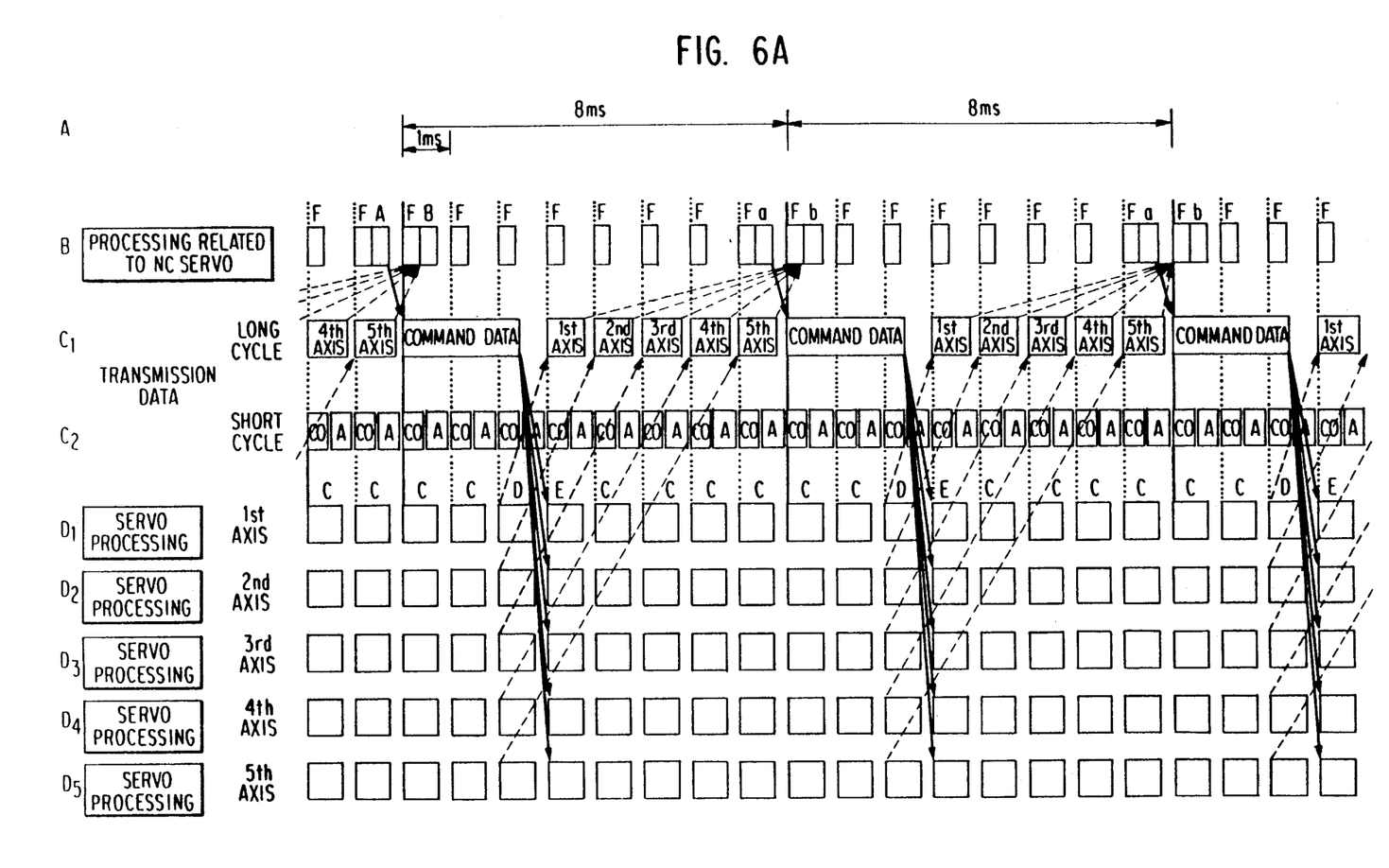
FIGS. 6A and 6B are time charts of the several processings conducted for short cycles and long cycles, respectively, according to the present invention.
Figure 6B:
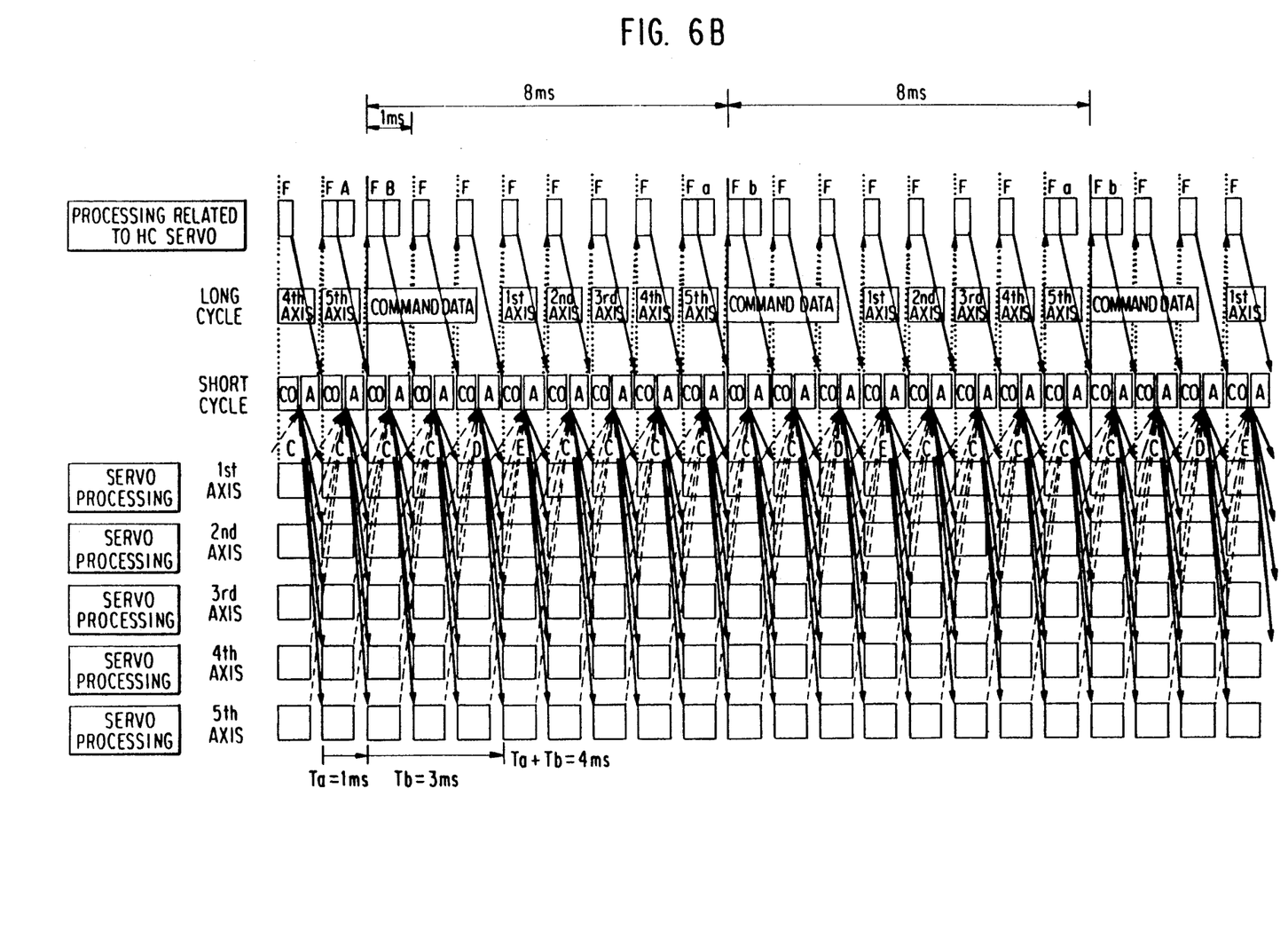

The operation of the present invention may be best understood from the transmission timing charts for long and short cycle operations, as seen in FIGS. 6A and 6B, respectively. The charts are organized in a manner similar to that of the conventional operation chart in FIG. 10, but the data transmission now comprises both a long cycle line C1 and a short transmission line C2. The two cycles are conducted on separate transmission lines and exist concurrently, as seen in both Figures.

Referring first to line B in each of the two Figures, the processing related to the NC unit includes in each 1 ms period a processing F for formation of a position command, transmission of position command and receipt of present position information. The processings A for transmitting parameters and the processings B for receiving data are conducted with the same frequency as seen in the conventional system. As seen in line C1 of FIG. 6A, the data transmission for the long cycle has the same sending end and receiving end structure as in the conventional system. The servo processings for each axis appear as in the conventional system. Moreover, notwithstanding the periodic presence of the processings F in the long cycle of data flow, the formation of sending data in response to the end of processing A and the commencement of processing B in response to the servo axis data is the same as in the conventional system. A comparison with the structure of the short cycle is seen in line C2 where, in each 1 ms time period, there is a processing A for transmission of axis parameters and a processing Co for receipt of position commands.

The short cycle processing may be considered in detail by reference to FIG. 6B. As seen in lines B and C2, the end of each processing F results in the generation of command data in the next periodic processing, as represented by the solid line arrow from the end of each processing F to the short cycle data $C_O$ in the next 1 ms period. The sending end information from the NC to the several servos is illustrated in FIG. 3B. Similarly, with reference to lines C2 and D1–D5, the short cycle processing for an identified axis will result in a processing F in the next cycle period. The servo processing information for all axes is fed into the next periodic short cycle data transmission, the information for each axis being represented by the illustration of FIG. 3C.

Accordingly, since certain critical processings, such as the processing of sending end position commands, may be executed on the short cycle end, the position command information is updated in 1 msec. Hence, when the skip stop function is used, for instance, the maximum delay for a positioning stop is only 1 ms. This design will reduce coasting to a relatively small value, thereby decreasing stopping position variations.

Other less-time-sensitive processings may be conducted using the conventional (long cycle end) processing.

The dual cycle structure is capable of effectively handling urgent data requests separately from those that may be delayed, such as positioning and display.

It is apparent that the servo amplifiers 8-1 to 8-N may carry out control from speed control, current control, PWM control, base amplifier, etc., in addition to the control from position control onward mentioned in the preferred embodiments.

Figure 4:
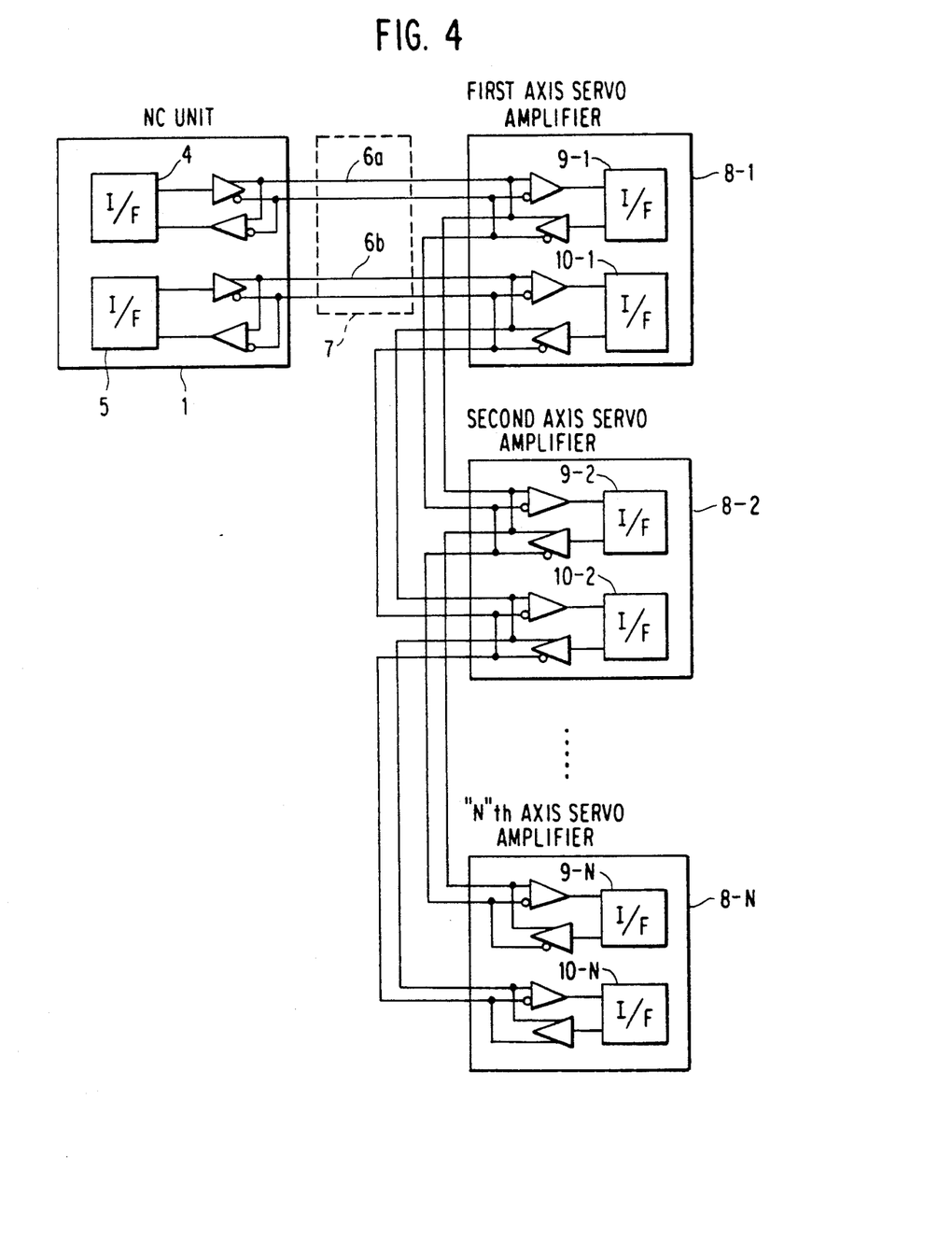
FIG. 4 is a configuration diagram illustrating another embodiment of an information transmission system between a servo mechanism and a NC unit, according to the present invention.
Figure 5:
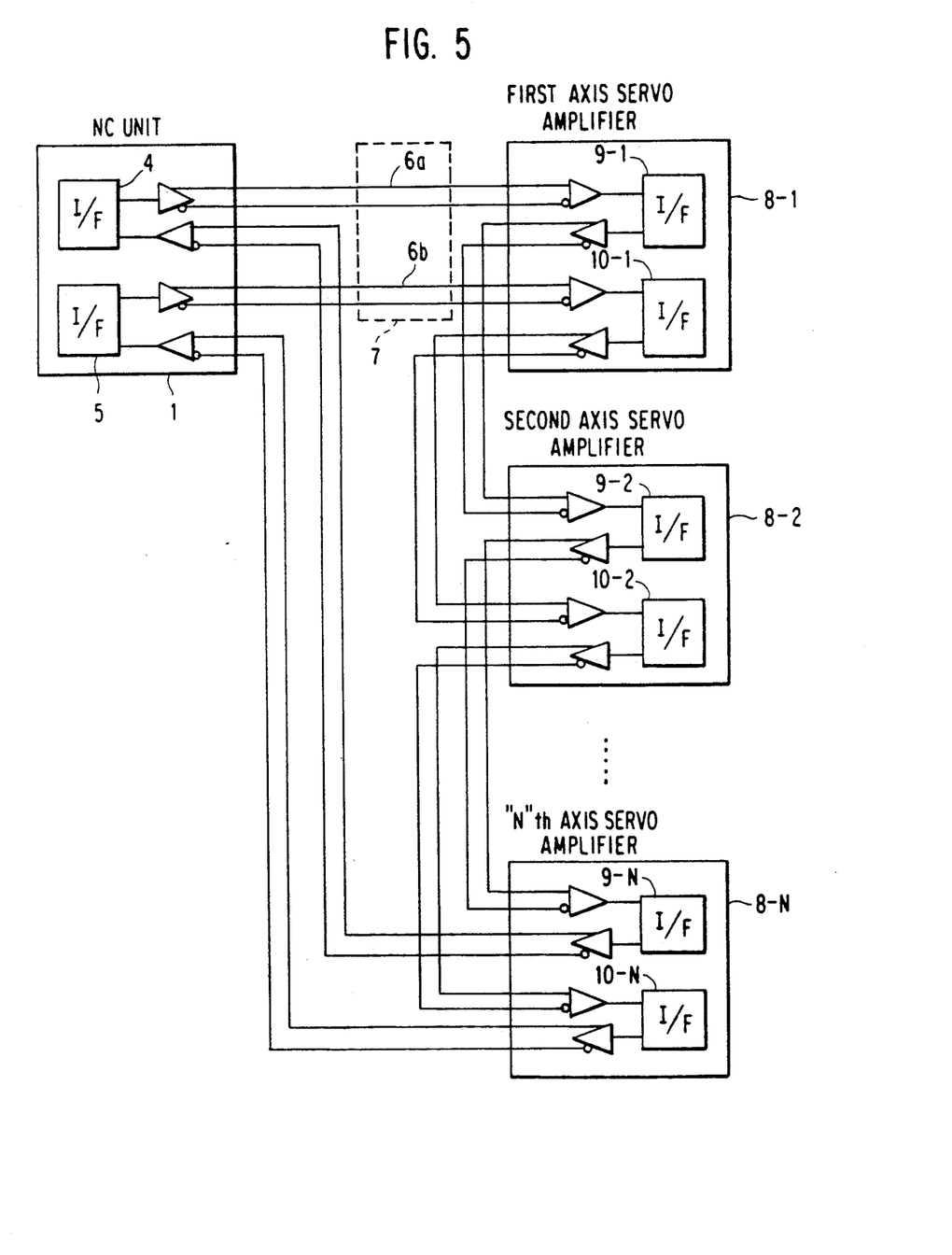
FIG. 5 is a configuration diagram illustrating a further embodiment of an information transmission system between a servo mechanism and an NC unit, according to the present invention.

Further, the transmission path may be in a multidrop format as known in FIG. 4 or in a ring format as illustrated in FIG. 5. In the two Figures, the NC unit 1 and servo unit 8 comprises the same components as seen in FIG. 1, but are connected in other well known formats.

It will be apparent that the invention, as described in the above preferred embodiments, achieves an information transmission system applicable to a servo mechanism, wherein a plurality of serial data transmission paths are provided between an NC unit and servo amplifiers and the transmission paths are different in communication cycle in order to allow rapid-response control for large volumes of information transmitted, the invention is not limited thereto. In particular, the invention can be applied to a transmission loop in a programmable controller (PC). In this application, the control demand is not limited to servo data but may relate to ON/OFF information of switches.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A serial information transmission system connecting in a control unit and a slave mechanism, having a plurality of slave units, said control unit being operative to generate sending end data and said slave units being operative to generate receiving end data, comprising;
    a transmission path means, comprising a first and second transmission path, said first path having a s communication cycle different from said second path;
    means for separating said sending end data into first and second sending end data on the basis of predetermined criteria;

means for separating said receiving end data into first and second receiving end data on the basis of predetermined criteria;

means for transmitting one of said first and second sending end data on one of said first and second transmission paths on the basis of predetermined criteria; and means for transmitting one of said first and second o receiving end data on one of said first and second transmission paths on the basis of predetermined criteria.

2. The system of claim 1 wherein said predetermined criteria are based on the urgency of data and commands.

3. The system of claim 1 further comprising means for performing processings on a short cycle timing for at least one of formation of data and commands, transmission of such data and commands and receipt of data and commands.

4. The system of claim 1 wherein said transmission path means comprises a plurality of transmission media connecting said control unit to said slave units in at least one of a multidrop format and a ring format.

5. A method of transmitting information between a z control unit and a slave mechanism, comprising a plurality of units, in a loop defined by a transmission means, comprising:

generating sending end information and receiving end information at said control unit and slave mechanism, respectively;

separating said generated information on the basis of urgency into at least first and second sending end data and sending said first sending end data at a short cycle rate and sending said second sending end data at a long cycle rate, said cycle rates being different.

6. The method of claim 5 further comprising separating said generated information on the basis of urgency into at least first and second receiving end data; and sending said first receiving end data at a short cycle rate and sending said second receiving end data at a long cycle rate, said short and long cycle rates being s different.

7. The method of claim 6 wherein said short cycle rates for sending end data and receiving end data are substantially the same.

8. The method of claim 6 wherein said long cycle rates for sending end data and receiving end data are substantially the same.

9. The method of claim 6 further comprising assembling send end data from said plurality of units into a send end block and assembling receive end data from said plurality of units into a receive end data block and sending said blocks in a cycle having a duration less than that of said long cycle.

10. The method of claim 6 wherein said control mechanism and slave mechanism comprise one of a programmable controller and a numerical controller system.

11. The method of claim 6 wherein said long cycle and short cycle transmissions are conducted concurrently.

12. The method of claim 5 wherein said sending step for sending end data comprises transmitting said first and second data on separate transmission media.

13. The method of claim 5 wherein said sending step for sending end data comprises transmitting said first and second data at different frequencies.

* * * * *